United States Patent
Liu

(10) Patent No.: US 8,453,118 B2
(45) Date of Patent: May 28, 2013

(54) AUTOMATED MULTI-OPERATING SYSTEM TESTING WITH VIRTUALIZATION

(75) Inventor: Yue Liu, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 853 days.

(21) Appl. No.: 12/367,901

(22) Filed: Feb. 9, 2009

(65) Prior Publication Data

US 2010/0205582 A1    Aug. 12, 2010

(51) Int. Cl.
*G06F 11/36* (2006.01)

(52) U.S. Cl.
USPC ............................................. 717/127; 714/38

(58) Field of Classification Search
USPC ......................................................... 717/127
See application file for complete search history.

(56) References Cited

U.S. PATENT DOCUMENTS

| | | | |
|---|---|---|---|
| 7,823,023 B2* | 10/2010 | Kwan et al. | 714/38.1 |
| 7,979,569 B2* | 7/2011 | Eisner et al. | 709/231 |
| 8,032,351 B2* | 10/2011 | Stringham | 703/21 |
| 2008/0178143 A1* | 7/2008 | Dougan et al. | 717/100 |
| 2008/0229288 A1* | 9/2008 | Nelson et al. | 717/127 |

OTHER PUBLICATIONS

VMware vCenter Lab Manager 3.0, Sep. 12, 2008 (http://www.vmware.com/pdf/lm30_users_guide.pdf).*
VMware vCenter Lab Manager 3.0, Sep. 12, 2008 (http://www.vmware.com/pdf/lm30_users_guide.pdf; hereinafter "VMware").*

* cited by examiner

*Primary Examiner* — Don Wong
*Assistant Examiner* — Deric Ortiz
(74) *Attorney, Agent, or Firm* — Hickman Palermo Truong Becker Bingham Wong LLP; Daniel D. Ledesma

(57) ABSTRACT

Techniques are provided for testing one or more applications across multiple operating systems (OSs) using virtualization. A device includes a virtualization application and a dispatcher. The virtualization application allows a plurality of guest OSs to execute on a device. The dispatcher is configured to cause a particular file to be stored in a particular location. Each guest OS includes a listener that detects when a file is stored in the particular location. When the listener of each guest OS detects that the particular file is stored in the particular location, the guest OS is configured to perform one or more tasks associated with the particular file. Each guest OS is configured to generate output in response to performing the one or more tasks. The dispatcher is further configured to analyze the output from each of the guest OSs.

20 Claims, 3 Drawing Sheets

AUTOMATED MULTI-OPERATING SYSTEM TESTING WITH VIRTUALIZATION

FIELD OF THE INVENTION

The present invention relates to automating the testing of one or more applications across multiple operating systems using virtualization.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Different computers run different operating systems (OSs). If an application vendor, such as Mozilla, desires to have an application run on all OS platforms, then an application should be tested on each OS. However, there are many OSs including many different Linux distributions. Thus, testing an application on each OS may take a significant amount of time.

To compound the problem, some OS providers release a new version of their OSs relatively frequently. For example, whereas Microsoft's OS is released every 3-5 years, Apple releases a new version of Mac OS every 18 months. Further, Fedora Linux releases a new version of its OS bi-yearly. Open Suse Linux also releases a new version of its OS bi-yearly.

It is not guaranteed that an application that runs on one version of an OS is able to run on another version of the OS. This is at least partly due to the fact that different releases have different versions of libraries and the libraries might not be backward compatible. Thus, if an application vendor does not provide an application's executable binary for a particular OS, then a user must download the application's source code, compile the source code, and generate the executable binary on the user's computer.

However, requiring the user to perform certain steps lessens the quality of the user's experience and may act as a deterrent to many users from using the application. On the other hand, an application vendor wants to limit the amount of quality assurance (QA) cost to ensure OS compatibility. Thus, many times, an application vendor may only ensure that certain (e.g., popular) OS releases are supported while hoping that the application will run properly on the other OS releases.

SUMMARY

According to an embodiment of the invention, a device comprises a dispatcher and a virtualization application. The virtualization application allows a plurality of guest OSs to execute on the device. No guest OS in the plurality of guest OSs is the same as another guest OS in the plurality of guest Oss. The dispatcher is configured to cause a particular file to be stored in a particular location. Each guest OS of the plurality of guest OSs includes a listener that detects when a file is stored in the particular location. Each of the plurality of guest OSs is configured to perform one or more tasks, associated with the particular file, when the listener of said each guest OS detects that the particular file is stored in the particular location. Each guest OS of the plurality of guest OSs is configured to generate output in response to performing the one or more tasks. The dispatcher is further configured to analyze the output from each of the plurality of guest OSs.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided herein for automatically testing one or more applications across multiple operating systems using virtualization. A device includes a virtualization application and a dispatcher. A virtualization application allows multiple guest OSs to execute on a single device. A dispatcher automatically issues multiple commands to the virtualization application, which commands cause the guest OSs to perform the one or more tasks, such as compiling certain source code into an executable binary and testing the executable binary to determine whether it executes properly. Each guest OS performs the same one or more tasks. A purpose of the testing is to ensure that each guest OSs executes the one or more tasks successfully. Each guest OS generates output in response to performing the one or more tasks. The dispatcher then analyzes the output from each of the guest OSs to determine whether the one or more tasks were performed successfully by each guest OS. In this way, a QA tester is not required to manually test the application on each operating system.

System Architecture

Figure 1:
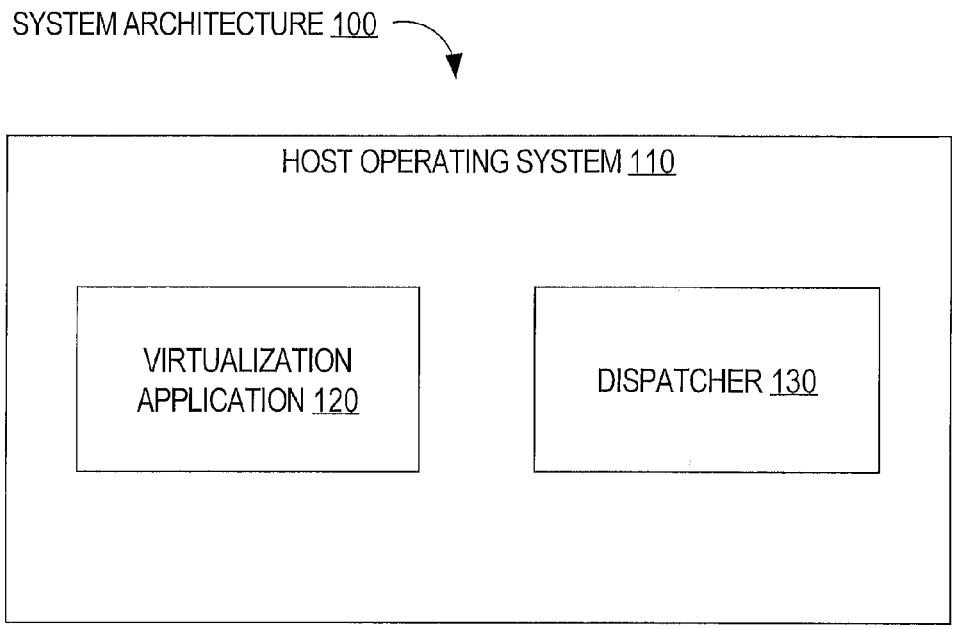
FIG. 1 is a block diagram that depicts an example system architecture 100, according to an embodiment of the invention.

FIG. 1 is a block diagram that depicts an example system architecture 100, according to an embodiment of the invention. System architecture 100 includes a host operation system (OS) 110, a virtualization application 120 and a dispatcher 130. Both virtualization application 120 and dispatcher 130 run within the environment of host OS 110.

Host OS 110 may be Linux-based, Windows-based, or Mac-based. Embodiments of the invention are not limited to any particular host OS.

Virtualization Application

Virtualization application 120 is a software platform that allows multiple "guest" operating systems (OSs) to run on a host computer at the same time. There are two types of virtualization applications. The first type of virtualization applications runs directly on a given hardware platform. Thus, a guest OS runs at the second level above the hardware. A non-limiting example of the first type includes Oracle KVM, which is free software that is licensed under GNU General Public License (GPL2).

The second type of virtualization applications runs within the host OS environment. Thus, a guest OS runs at the third level above the hardware. Non-limiting examples of the second type include VMware Workstation and Microsoft's Virtual PC. Although FIG. 1 depicts virtualization application 120 as the second type, embodiments of the invention are not limited to any particular virtualization application or any type thereof.

Figure 2:
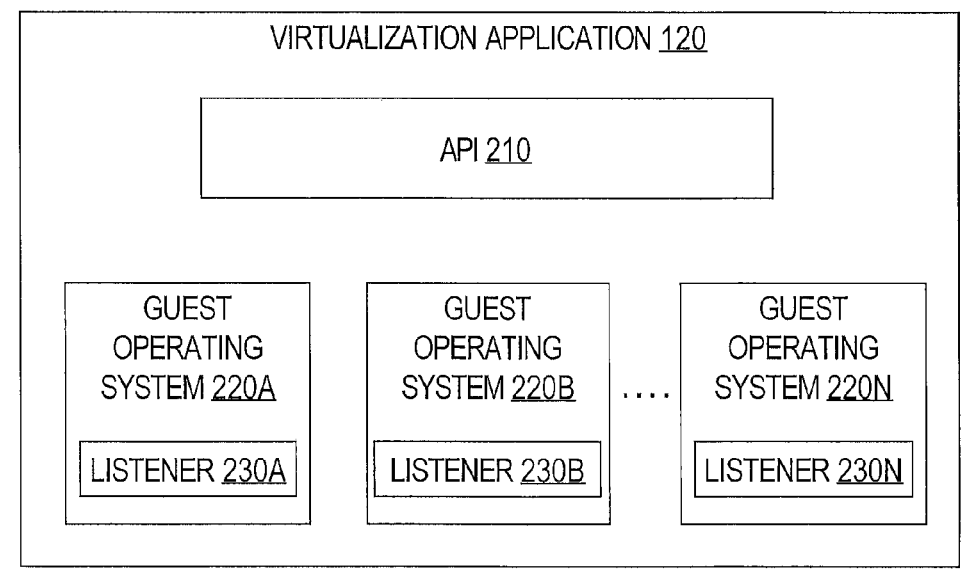
FIG. 2 is a block diagram that depicts various components of virtualization application 120, according to an embodiment of the invention.

FIG. 2 is a block diagram that depicts at least two components of virtualization application 120, according to an embodiment of the invention. Virtualization application 120 includes an API 210 and multiple guest operating systems 220A-N. A user or program (e.g., dispatcher 130) may use API 210 to send instructions to one or more of guest OSs 220A-N. One example of API 210 is a command line API.

In the depicted example, each of guest OSs 220A-N is associated with a corresponding listener 230. Listeners 230A-N are scripts or programs that detect when a file is stored in a certain location, such as when a file is stored in a particular network folder. As explained in detail below, listeners 230A-N are not required for all embodiments of the invention.

Dispatcher

Dispatcher 130 interacts with API 210 to cause guest OSs 220A-N to perform one or more tasks. In the depicted embodiment, dispatcher 130 uses API 210 to send instructions to and receive information about each of guest OSs 220A-N. Non-limiting examples of such instructions include starting (or launching) a guest OS, taking a snapshot of a guest OS (which creates a backup of the guest OS), shutting down a guest OS, reverting a guest OS to a previous (or particular) snapshot of the guest OS, and running a program in a guest OS. Non-limiting examples of information that dispatcher 130 may receive using command line API 210 include a list of all running guest OSs, a list of all snapshots of a guest OS, a list of the processes running in a guest OA, and a list of the contents of a directory in a guest OS. Dispatcher 130 may be implemented in computer software, computer hardware, or any combination of computer software and computer hardware.

In an alternative embodiment, each guest OS 220 runs a web server. Thus, dispatcher 130, running a web client, communicates with guest OSs 220A-N using Hypertext Transfer Protocol (HTTP). For example, dispatcher 130 sends a HTTP post message that includes an instruction and/or a file (e.g., an executable script) to execute.

In a related embodiment, dispatcher 130 runs a web server. Each guest OS 220 sends, to dispatcher 130, a HTTP request message that requests instructions and/or a file to execute. In response, dispatcher 130 responds with a HTTP post message that includes the instructions and/or file to execute.

In a related embodiment, dispatcher 130 configures each guest OS 220 to, at start-up of the guest OS 220, retrieve a script located at a particular location and execute the script. The particular location may be on a device that is local or remote relative to the device upon which host OS 110 executes.

EXAMPLE COMMUNICATION BETWEEN DISPATCHER AND GUEST OS

Figure 3:
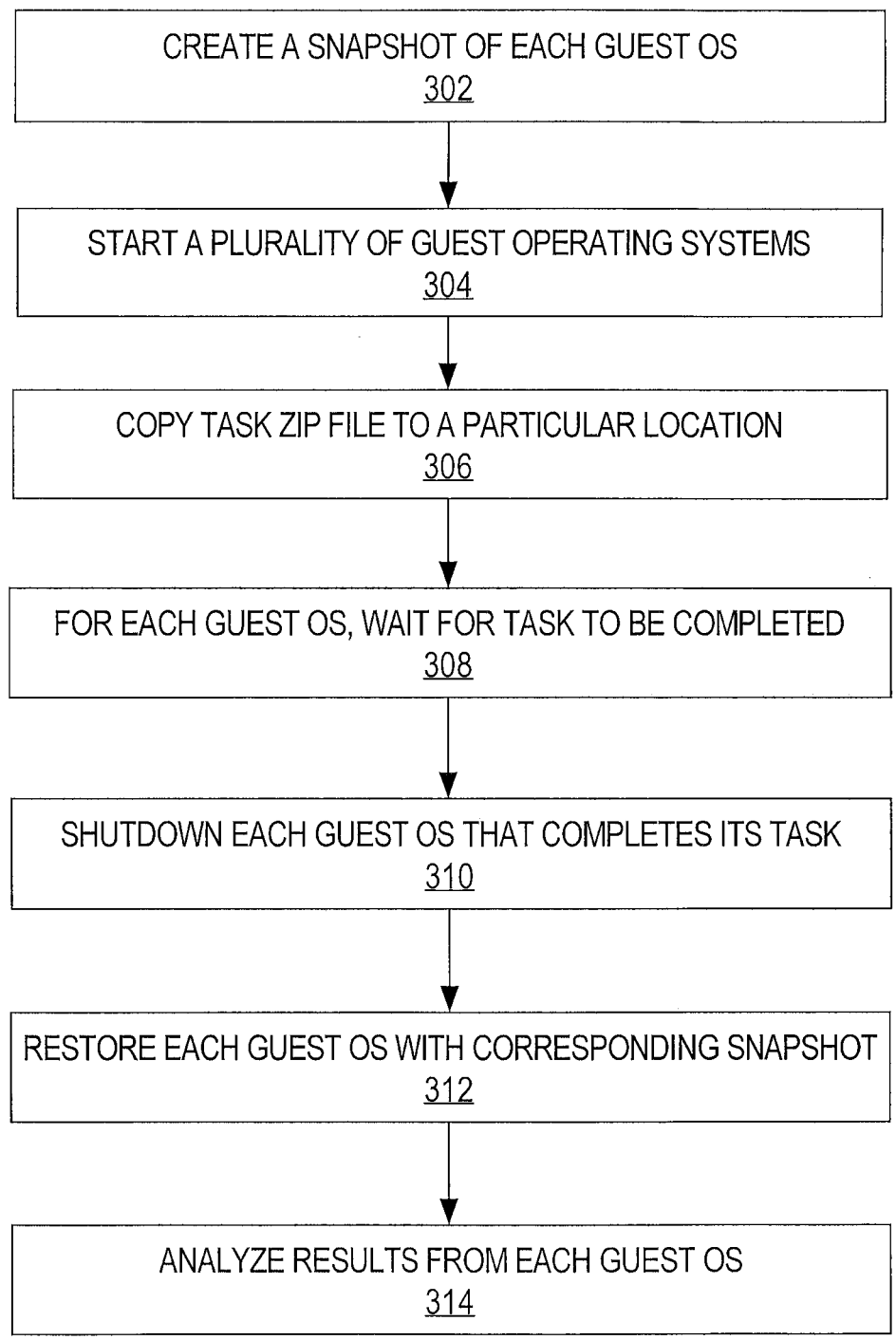
FIG. 3 is a flow diagram that depicts an example of the instructions that a dispatcher sends to multiple guest OSs to enable the guest OSs to perform a task, according to an embodiment of the invention.

FIG. 3 is a flow diagram that depicts an example of the instructions that dispatcher 130 sends to multiple guest OSs to enable the guest OSs to perform a task, according to an embodiment of the invention. At step 302, dispatcher 130 causes (e.g., via API 210) a snapshot of each guest OS to be created. This step is optional if there is no intention to revert a guest OS to a previous state. From the point of view of virtualization application 120, each guest OS is stored as a file. A snapshot may be taken of a guest OS when the guest OS is not running.

At step 304, dispatcher 130 causes a plurality of guest OSs to start, such as guest OSs 220A-N. Upon starting, each guest OS runs a listener program, such as listener 230A.

Dispatcher 130 may cause one guest OS at a time to start and perform a task. Alternatively, dispatcher 130 may cause all (or multiple) guest OSs to start and perform one or more tasks in parallel. Host OS 110 may limit the number of guest OSs that can run at one time due to one or more resource constraints, such as memory size, CPU power, and physical USB connection. A USB connection may be a significant constraint if, for example, one of the tasks is to run a printer driver and print to a USB printer.

Also, some tasks do not make "significant" changes to a guest OS. Such tasks are referred to as "non-intrusive" tasks. A "significant" change is a change that may have a negative effect on subsequent tasks that the guest OS (or other processes on the guest OS) performs. An example of a non-intrusive task is running a calculator application. An example of an intrusive task is installing a printer driver, which installation changes the configuration settings of a guest OS and may prevent other printer drivers to be subsequently installed and/or tested. If a task is non-intrusive, then a snapshot of the guest OS is not required before the guest OS performs the task. Thus, step 304 may be skipped if one or more tasks that a guest OS is to perform are non-intrusive.

At step 306, dispatcher 130 copies a task zip file to a particular location. The particular location may be a "hot" folder. A "hot" folder is a folder to which multiple listeners "listen"; that is, multiple listeners monitor the folder to detect when new (or particular) contents are added to the folder. When such contents are added to the hot folder, the listeners copy those contents into the local memory of their corresponding guest OSs so that the corresponding guest OSs can process the contents. A hot folder may reside on (a) the device upon which host OS 110 is running or (b) another device.

The task zip file includes one or more tasks to perform. In another example, the one or more tasks are not zipped. In either case, such tasks may include generating a binary executable file from source code and executing the binary executable file to determine whether it executes properly. Thus, a task zip file may include an executable script, referred to as a batch file. For Linux-based distributions, the batch file is a .sh script, whereas for Windows-based distributions, the batch file is a .bat script. Some batch files are capable of being processed by many different versions of an operating system. For example, Fedora Linux distribution releases a new version of its operating system approximately every 6 months. A single .sh script may be read by each release, which totals at least ten (10) releases.

At step 308, dispatcher 130 waits for each guest OS to complete the one or more tasks. Dispatcher 130 may wait for a pre-determined period of time. Additionally or alternatively, dispatcher 130 may wait for output and/or log information from one or more of the guest OSs before proceeding to the next step. Specifically, dispatcher 130 may examine a hot folder (either the same as in step 306 or a different hot folder) to determine whether one or more guest OSs have completed their respective task(s).

While dispatcher 130 is waiting, a listener on a guest OS copies the task zip file into a local directory, unzips the zip file, and runs one or more of the "unzipped" scripts. As a result of executing the scripts, a guest OS performs one or more tasks, generates output, and captures log information. The guest OS (or listener) sends the output and/or log information to dispatcher 130 via a HTTP response message or saves such information in a folder on host OS 110 or in a folder on another device that is accessible by dispatcher 130 via a network. The output and/or log information may include an identifier (referred to herein as a "guest ID") that identifies the guest OS that created the output and log information. Dispatcher 130 may then use the guest ID to identify which results originated from which guest OSs.

If one of the tasks is to compile source code that was included in the task zip file and generate a binary executable, then the output may include the binary executable itself and/or an indication of whether the compilation was successful.

If one of the tasks is to execute a binary executable, then the output may include results of the execution and/or an indication of whether the binary executable executed properly, e.g., without crashing.

At step 310, dispatcher 130 causes each guest OS (e.g., via API 210) that completes its task(s) to shut down.

At step 312, dispatcher 130 causes each guest OS that has been shut down to be restored with its corresponding snapshot that was created in step 304.

At step 314, dispatcher 130 analyzes the results from each guest OS. Dispatcher 130 is not required to wait for all guest OSs to complete their task(s) before analyzing the results from guest OSs that have completed their task(s). An example of dispatcher 130 analyzing the results includes validating the number of output files (e.g., one per guest OS tested) and searching for a specific string in a log file (e.g., WARNING, ERROR, SUCCEED).

The steps in FIG. 3 are not required to be performed in the particular order depicted. For example, step 314 may be performed before steps 310 and 312. In fact, as described in more detail below, steps 304, 310, and 312 may not be performed at all.

Additional Embodiments

In addition to the embodiments referred to previously, additional embodiments are possible. For example, an extra snapshot of a guest OS is taken after the guest OS completes its task(s) in order to preserve that state of the guest OS. This extra snapshot may be used for debugging purposes.

Between two successive tasks, a snapshot of a guest OA may or may not be taken. For example, if a second task is not dependent upon a first task, then a snapshot before the second task is not created. Instead, dispatcher 130 either reverts the guest OS to a previous snapshot (or clean state) or none at all.

As another example, dispatcher 130 uses API 210 to issue the one or more tasks and start a program in a guest OS directly, instead of relying on a listener in the guest OS to copy a task zip file from a hot folder and cause the task(s) to be performed.

As another example, dispatcher 130 uses API 210 to check one or more files in a guest OS directly, instead of relying on the guest OS to return output and/or log information to a "hot" folder to which other guest OSs send output.

As another example, step 304 may be skipped (even for intrusive tasks) if the guest OS reverts to a pre-configured snapshot before each new task.

Benefits

Many benefits may be realized by embodiments of the invention. One benefit includes time savings. Embodiments of the invention provide a virtualization framework for automatically testing one or more applications for multiple OSs at once based on a single input from a user or based on executing a single script. Although multiple user inputs may be required to set up the virtualization framework, the testing of multiple operating systems is performed based on a single user input.

Another benefit is a less likelihood of human error. Because testing is automated, any human error must have been introduced during the setup of the virtualization framework, such as composing an incorrect task zip file, starting a wrong set of guest OSs, or failing to instruct dispatcher 130 to create and/or revert to a snapshot.

Implementation Mechanisms

Figure 4:
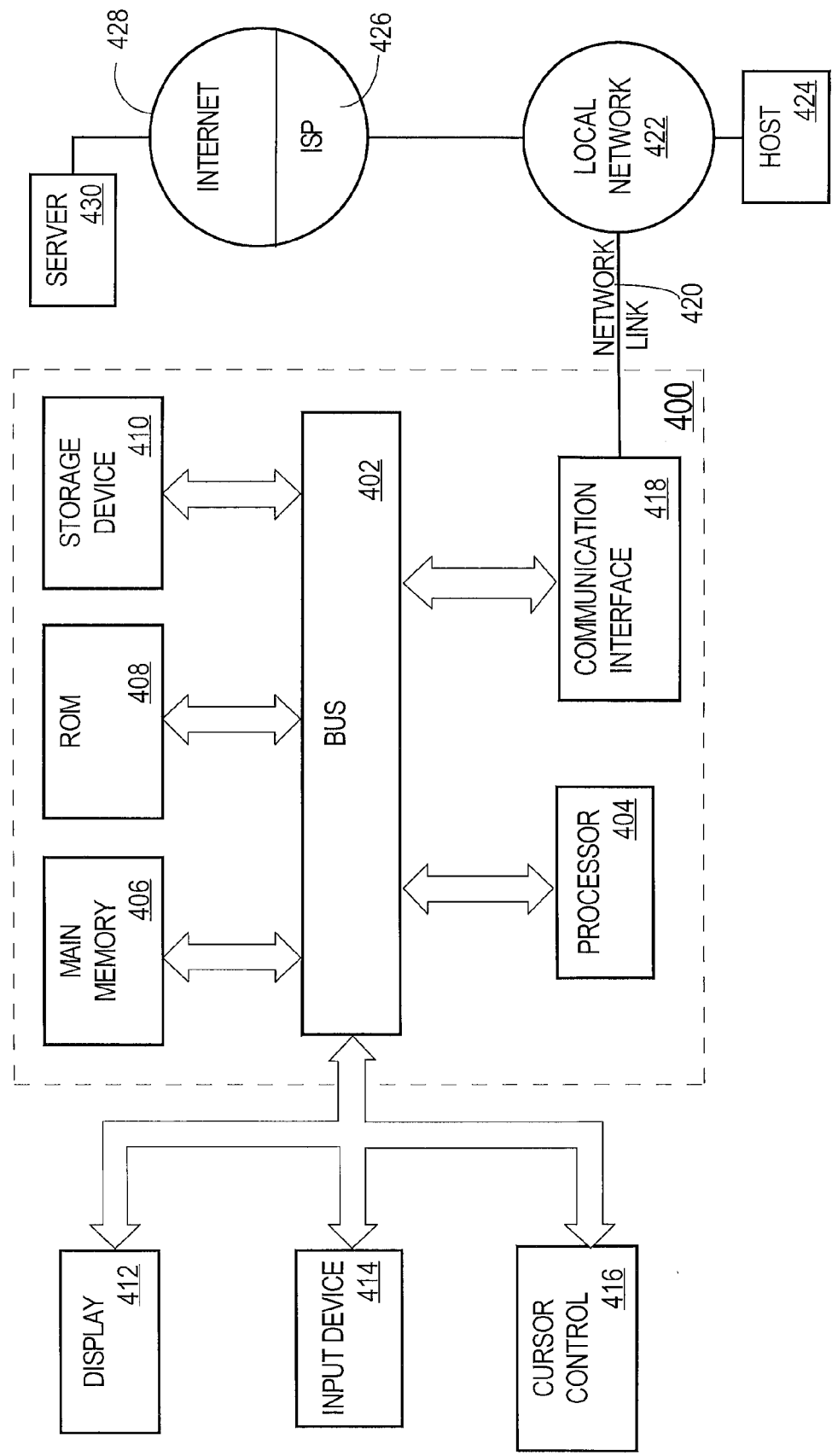
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A device comprising:
one or more processors;
a virtualization application that includes and allows a plurality of guest OSs to execute on the device, wherein at least two guest OSs in the plurality of guest OSs are not the same; and
a dispatcher that is separate from the virtualization application and that is configured to cause performance of one or more tasks within each guest OS of the plurality of guest OSs, wherein the one or more tasks include testing, on said each guest OS, an executable of a particular application;
wherein each guest OS of the plurality of guest OSs includes a listener that executes one or more scripts to perform the one or more tasks within said each guest OS and generate output based on the performance of the one or more tasks;
wherein each listener in each guest OS of the plurality of guest OSs is configured to perform one or more operations on the output.

2. The device of claim 1, wherein the dispatcher is further configured to:
determine if any errors were generated while said each guest OS executed the executable that corresponds to said each guest OS.

3. The device of claim 1, wherein:
the dispatcher is configured to cause performance of the one or more tasks by causing a particular file to be stored in a particular location;
the listener of each guest OS of the plurality of guest OSs detects when files are stored in the particular location; and performance of the one or more tasks, associated with the particular file, is triggered when the listener of said each guest OS detects that the particular file is stored in the particular location.

4. The device of claim 1, wherein:
the dispatcher is configured to cause performance of the one or more tasks by sending a particular file to each guest OS directly; and
each guest OS of the plurality of guest OSs is configured to receive the particular file and perform the one or more tasks associated with the particular file.

5. The device of claim 1, wherein the dispatcher is further configured to:
before causing performance of the one or more tasks, cause a snapshot of said each guest OS to be created; and
after performance of the one or more tasks, cause said each guest OS to revert to the snapshot that corresponds to said each guest OS.

6. The device of claim 1, wherein the plurality of guest OSs include different versions of a Linux-based OS, a Windows-based OS, or an Mac-based OS.

7. The device of claim 1, wherein the dispatcher is further configured to communicate with the plurality of guest OSs using:
an application programming interface (API) provided by the virtualization application; or
Hypertext Transfer Protocol (HTTP).

8. The device of claim 1, wherein the particular application is a printer driver.

9. One or more non-transitory machine-readable media carrying instructions which, when executed by one or more processors, cause:
causing, by a dispatcher, performance of one or more tasks within each guest OS of a plurality of guest OSs, wherein the one or more tasks include testing, on said each guest OS, an executable of a particular application;
wherein a virtualization application includes and allows the plurality of guest OSs to execute simultaneously on a device, wherein at least two guest OSs in the plurality of guest OSs are not the same;
wherein the dispatcher is separate from the virtualization application;
wherein each guest OS of the plurality of guest OSs includes a listener that executes one or more scripts to perform the one or more tasks within said each guest OS and generate output based on the performance of the one or more tasks;
wherein each listener in each guest OS of the plurality of guest OSs is configured to perform one or more operations on the output.

10. The one or more non-transitory machine-readable media of claim 9, wherein the instructions, when executed by the one or more processors, further cause:
determining if any errors were generated while said each guest OS executed the executable that corresponds to said each guest OS.

11. The one or more non-transitory machine-readable media of claim 9, wherein:
causing performance of the one or more tasks includes causing a particular file to be stored in a particular location;
the listener of each guest OS of the plurality of guest OSs detects when files are stored in the particular location; and
performance of the one or more tasks, associated with the particular file, is triggered when the listener of said each guest OS detects that the particular file is stored in the particular location.

12. The one or more non-transitory machine-readable media of claim 9, wherein:
causing performance of the one or more tasks includes sending a particular file to each guest OS directly; and
each guest OS of the plurality of guest OSs is configured to receive the particular file and perform the one or more tasks associated with the particular file.

13. The one or more non-transitory machine-readable media of claim 9, wherein the instructions, when executed by the one or more processors, further cause:
before causing performance of the one or more tasks, causing a snapshot of said each guest OS to be created; and
after performance of the one or more tasks, causing said each guest OS to revert to the snapshot that corresponds to said each guest OS.

14. The one or more non-transitory machine-readable media of claim 9, wherein the plurality of guest OSs include different versions of a Linux-based OS, a Windows-based OS, or an Mac-based OS.

15. The one or more non-transitory machine-readable media of claim 9, wherein:
a first guest OS in the plurality of guest OSs is a Linux-based OS; and
a second guest OS in the plurality of guest OSs is a Windows-based OS.

16. The one or more non-transitory machine-readable media of claim 9, wherein the particular application is a printer driver.

17. A method comprising:
causing, by a dispatcher, performance of one or more tasks within each guest OS of a plurality of guest OSs, wherein the one or more tasks include testing, on said each guest OS, an executable of a particular application;
wherein a virtualization application includes and allows the plurality of guest OSs to execute simultaneously on a device, wherein at least two guest OSs in the plurality of guest OSs are not the same;
wherein the dispatcher is separate from the virtualization application;
wherein each guest OS of the plurality of guest OSs includes a listener that executes one or more scripts to perform the one or more tasks within said each guest OS and generate output based on the performance of the one or more tasks;
wherein each listener in each guest OS of the plurality of guest OSs is configured to perform one or more operations on the output;
wherein the method is performed by one or more computing devices.

18. The device of claim 1, wherein the dispatcher is configured to analyze the output.

19. The device of claim 1, wherein the one or more tasks include compiling source code and generating the executable that corresponds to said each guest OS.

20. The one or more non-transitory machine-readable media of claim 9, wherein the one or more tasks include compiling source code and generating the executable that corresponds to said each guest OS.

* * * * *